Nov. 10, 1925.

R. H. STALEY 1,561,368

MOTOR VEHICLE ATTACHMENT

Filed Jan. 3, 1921

2 Sheets-Sheet 2

Witness:
Jas. E. Hutchinson

Inventor:
Raleigh H. Staley,
By
Milans & Milans, Attorneys

Patented Nov. 10, 1925.

1,561,368

UNITED STATES PATENT OFFICE.

RALEIGH H. STALEY, OF SPRINGFIELD, ILLINOIS, ASSIGNOR TO THE BAKER MANUFACTURING COMPANY, OF SPRINGFIELD, ILLINOIS, A CORPORATON OF ILLINOIS.

MOTOR-VEHICLE ATTACHMENT.

Application filed January 3, 1921. Serial No. 434,542.

*To all whom it may concern:*

Be it known that I, RALEIGH H. STALEY, a citizen of the United States, residing at Springfield, in the county of Sangamon and State of Illinois, have invented certain new and useful Improvements in a Motor-Vehicle Attachment, of which the following is a specification, reference being had therein to the accompanying drawing.

My invention relates to new and useful improvements in motor vehicle attachments and more particularly to an attachment for hoisting or for securing a snow-plow, grader, or similar device to the front axle of the vehicle so that it may be propelled thereby.

The principal object of the invention is the provision of a device adapted to be connected to the front axle of a motor vehicle for hoisting and transporting various articles or which may be used for adjustably connecting and supporting a snow-plow, grader, or similar device, in front of the vehicle to be propelled in advance of said vehicle.

Another object of the invention resides in the construction of the device in such a manner that it may be secured to various types of motor vehicles employing longitudinally extending side springs secured to the axle.

A further object consists in the provision of means whereby the attachment may be adjusted for use with vehicles of various widths.

With the above and other objects in view my invention consists in the novel details of construction and arrangement of parts which will be more clearly understood from the following specification and drawings, which illustrates an embodiment of my invention and in which:—

Figure 1:
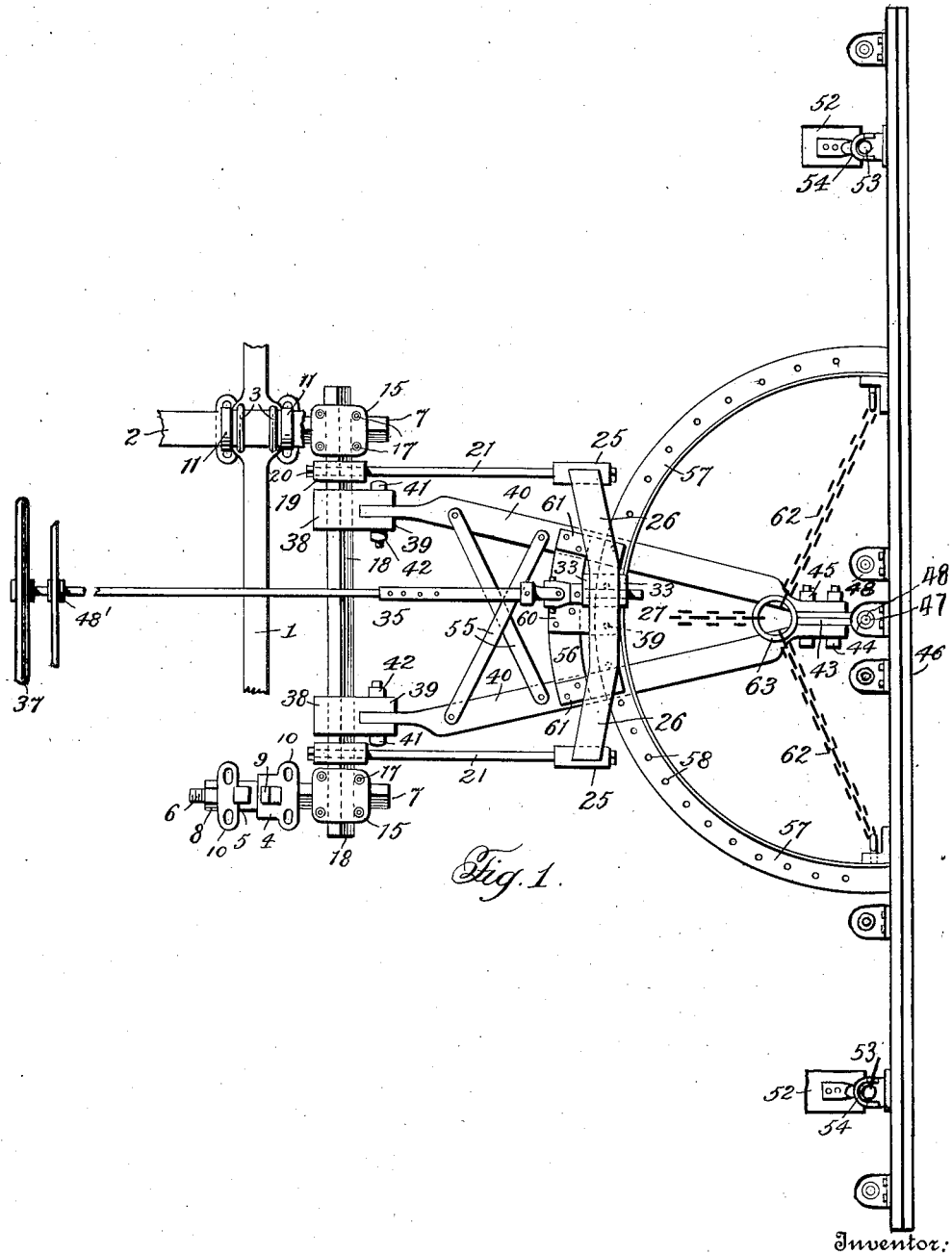
Figure 2:
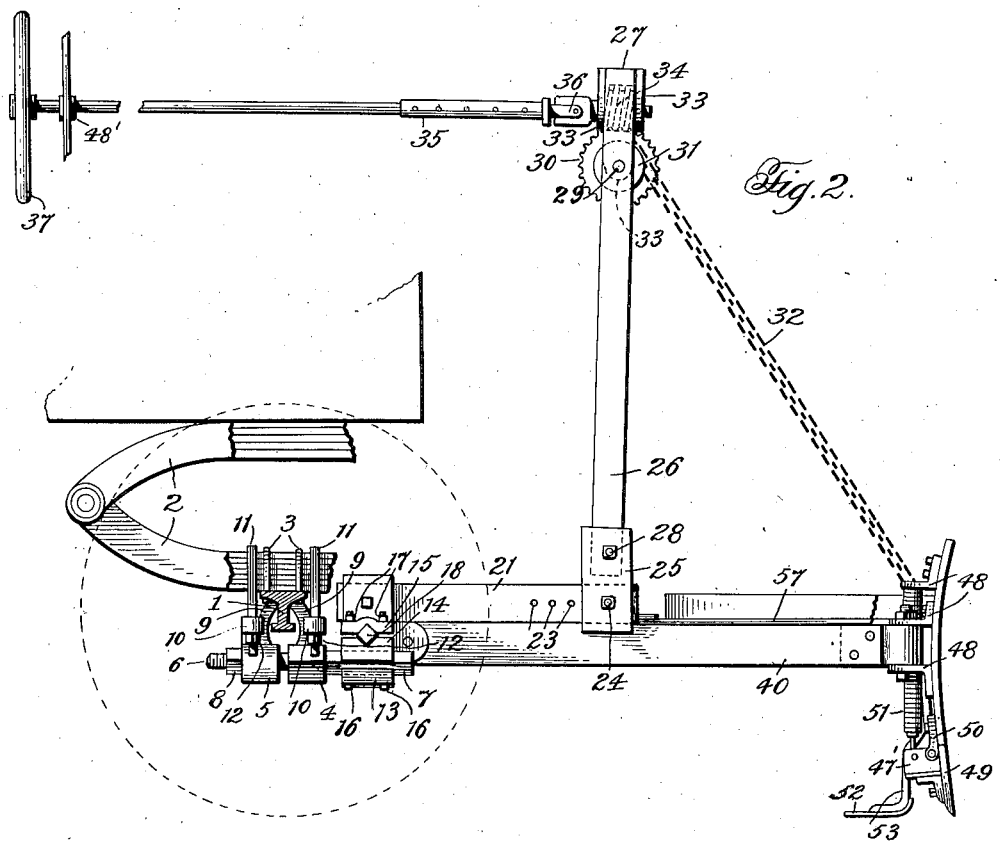
Figure 3:
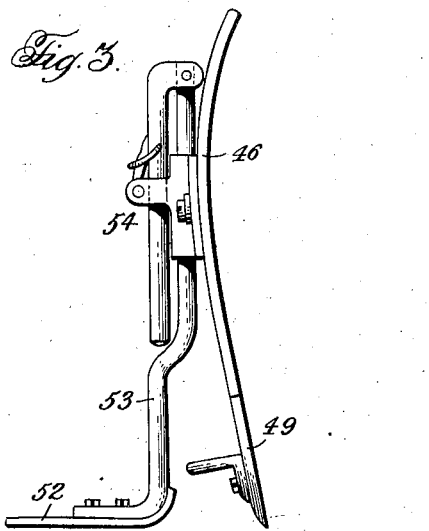
Figure 4:
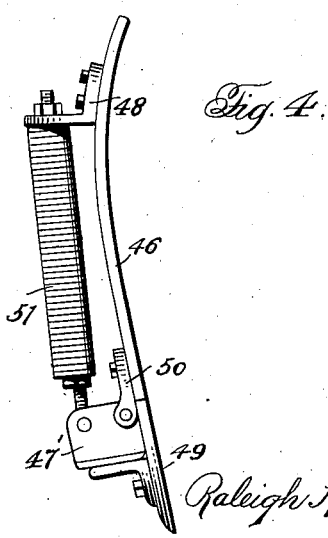

Figure 1 is a top plan.
Figure 2 is a side elevation.
Figures 3 and 4 are detail views.

In the drawings 1 indicates the front axle of a motor vehicle having the longitudinally extending side springs 2 secured thereto by means of the U-shaped clamping bolts 3.

My attachment consists of an axle clamp comprising the sections 4 and 5 provided with aligning openings therein for the reception of a connecting bolt, one end of which is rounded and exteriorly threaded as shown at 6 and the opposite end is squared as shown at 7. The rounded portion 6 is that part of the connecting bolt which passes through the openings in the sections of the clamp and the squared portion 7 forms a shoulder for engagement by the member 4. A nut 8 is received on the threaded portion 6 and engages the outer face of the clamp section 5 for adjusting the same towards the section 4. Each of the sections of the clamp is provided with an upwardly extending arm 9 which is adapted to engage the sides of the axle beneath the top as shown in the drawings. An ear 10 is formed on each side of each section of the clamp and U-shaped clamping members 11 are adapted to extend over the springs 2 and through the ears for securing the clamping members to the springs. Nuts 12 are received on the threaded ends of the U-shaped clamping members 11 and when tightened thereon engage the under sides of the ears 10.

Carried on the squared ends 7 of the clamp connecting bolts are three piece clamp members comprising plates 13, 14 and 15 connected together by means of bolts 16 having the nuts 17 received on the threaded ends thereof. The squared portion 7 of the connecting bolts are received in V-shaped openings formed in the opposed faces of the plates 13 and 14 and a subaxle 18 has its ends received in V-shaped recesses formed in the opposed faces of the plates 14 and 15. This subaxle extends parallel with the axle 1 of the vehicle and in front thereof.

Adjustably connected on the subaxle are the transversely spaced blocks 19 having longitudinally and transversely extending passages formed therein. These blocks are secured upon the subaxle, in adjusted position, by means of screws or bolts 20 which pass through the blocks and engage said subaxle which axle extends through the transverse passages. Bars 21 are carried by the adjustable blocks 19 and have one end extending through the longitudinally extending passages formed in the block and are held therein by means of screws or bolts 22. These bars 21 are provided, adjacent their outer ends, with longitudinally spaced openings 23 for receiving bolts 24 carried by castings 25 having passages therein for the reception of the outer ends of the bars. The castings 25 are provided in their upper surface with sockets adapted to receive the ends of an arch frame member which comprises inclined sides 26 and the horizontal top 27. The ends of the arch member are held in the sockets of the castings by means of the screws or bolts 28 which extend through the sides of the castings as shown.

A horizontal shaft 29 is supported between the sides 26 of the arch member, beneath the horizontal top 27 and has a gear 30 keyed thereon. A drum 31 is also supported upon the shaft 29, to one side of the gear 30, and has a chain 32 connected thereto for a purpose to be later described. Downwardly extending ears 33 are formed on the sides of the horizontal portion 27, of the arch member, and support a worm gear 34 which meshes with the gear 30. The telescopic shaft 35 is secured to the worm gear 34 by means of a universal joint 36 and has a hand wheel 37 secured to the opposite end.

The parts so far described, when attached to the vehicle, may be used as a hoist for hoisting and transporting various articles. It will be noted that I have utilized both the front axle and the side springs for securing the device to the vehicle. The article to be hoisted may be secured to the chain 32, in any desired manner, and by grasping the hand wheel 37 the telescopic shaft 35 and worm gear 34 will be rotated to in turn rotate the gear wheel 30 and wind the chain 32 upon the drum 31.

For connecting and supporting a snow-plow, grader, or similar device, I provide the transversely spaced castings 38 upon the subaxle 18. Each of the castings 38 are provided with the forwardly extending spaced arms 39 to receive the inner ends of longitudinally extending supporting bars 40. These bars 40 are pivotally connected to the castings 38 by means of the bolts 41 having nuts 42 thereon. The arms 40 converge toward the forward end and receive therebetween the member 43 which is secured in position by means of the bolts 44 and nuts 45. A mold board 46 is pivotally connected to the member 43 by means of a pin 47 which passes through brackets 48 secured to the rear face of the mold board and an eye formed in the member 43. A cutting blade 49 is hingedly connected to the lower edge of the mold board by the hinges 50, and compression springs 51 are secured to the brackets 48 secured to the mold board and brackets 47' secured to the cutting blade 49. These springs normally hold the cutting blade down as a continuation of the mold board, but if an obstruction is encountered the blade will swing rearwardly compressing the springs and allowing the blade to pass over the obstruction without breaking. After passing over the obstruction the springs will return the blade to normal position. Shoes 52 are secured to the inner face of the moldboard 46 by means of the vertical shaft 53 and clamp 54. These shoes are adapted to engage the ground so as to properly support the moldboard and space the cutting blade from the ground.

The bars 40 are connected, adjacent their inner or pivot ends, by cross bars 55 and the arcuate shaped plate 56. A curved plate 57 is secured to the moldboard 46 and extends over the top of the longitudinally extending bars 40. This plate 57 is provided with spaced openings 58 adapted to receive a pin 59 carried by a plate 60 secured to the top of the connecting plate 56. Plates 61 are carried by the bars 40 and extend over the top of the semi-circular plate 57 to properly hold the same in position. Chains 62 are secured to the moldboard 46 and are connected to the chain 32 by means of a ring 63. A clamp 48' is secured to the shaft 35 and may be used for connecting the shaft to the top edge of the instrument board or other suitable support.

From the above detailed description of the connection for the snow-plow or grader, it is thought that the operation will be clear. It will be understood that the cutting blade 49, carried by the moldboard 46 may be used either for plowing through snow or for grading. The moldboard 46 and blade 49 may be adjusted to various angular positions by means of the pin 59 extending through the openings 58 in the semi-circular plate 57. The moldboard will be swung upon the pivot point 47. When it is desired to raise or lower the beam supporting the moldboard and cutting blade the hand wheel 37 will be grasped to rotate the telescopic shaft 35 and worm gear 34. This will rotate the gear wheel 30 and drum 31 and wind the chain upon the drum. The chain 32 being connected to the moldboard by the chain 62 and ring 63 will raise or lower the moldboard as the bars 40 swing upon their pivot bolts 41 carried by the castings 38.

It will be noted that I have provided a comparatively simple attachment for a motor vehicle which is adapted for hoisting or for connecting a snow-plow, or grader, in front of the vehicle. The attachment is adjustable to vehicles of various widths and utilizes both the front axle and the springs of the vehicle for connecting purposes. In nearly all motor vehicles now constructed, side springs of the longitudinally extending type are connected to the axle and my attachment may be used with those vehicles using such springs.

While I have illustrated and described the preferred embodiment of the invention it will be understood that changes may be made as will fall within the scope of the appended claims.

Having fully described my invention what I claim as new and desire to secure by Letters Patent is:—

1. In combination with a motor vehicle, a longitudinally extending bar connected to the vehicle, a vertical frame carried by the bar, a hoisting drum carried by the frame, and means for operating the drum.

2. In combination with a motor vehicle, a longitudinally extending bar connected to the vehicle, a vertical frame adjustably carried by the bar, a hoisting drum carried by the vertical frame, and means for operating the drum.

3. In combination with a motor vehicle, transversely spaced longitudinally extending bars connected to the vehicle, a vertical frame carried by the longitudinally extending bars and adjustable thereon, a hoisting drum carried by the frame and means for operating the drum.

4. In combination with a motor vehicle, longitudinally extending bars connected to the vehicle, said bars being transversely adjustable, a vertical frame carried by the longitudinally extending bars, a hoisting drum carried by the frame and means for operating the drum.

5. In combination with a motor vehicle, a subaxle connected to the axle of the vehicle, longitudinally extending bars carried by the subaxle and transversely adjustable thereon, a vertical frame carried by the longitudinally extending bars, a hoisting drum carried by the frame and means for operating the drum.

6. In combination with a motor vehicle having longitudinally extending springs secured to the axle thereof, a clamp connected to the axle, means carried by the clamp for engaging a spring, a longitudinally extending bar carried by the clamp, a vertical frame carried by the bar, a hoisting drum carried by the frame and means for operating the drum.

7. In combination with a motor vehicle, a sub-axle connected to the axle of the vehicle, longitudinally extending bars carried by the sub-axle, a vertical frame carried by the longitudinally extending bars, a hoisting drum carried by the frame, and means for operating the hoisting drum.

8. In combination with a motor vehicle, a subaxle detachably connected to the vehicle axle, castings carried by the subaxle and transversely adjustable thereon, bars pivotally connected to the castings for vertical swinging movement, and a scraper connected to the bars.

9. In combination with a motor vehicle, a subaxle connected to the vehicle axle, a frame carried by the subaxle, a hoisting drum carried by the frame, means for operating the hoisting drum, longitudinally extending bars pivotally connected to the subaxle for vertical swinging movement, a scraper carried by the bars, and means carried by the hoisting drum for raising and lowering the pivoted bars and scraper.

10. In combination with a motor vehicle, a subaxle connected to the vehicle axle, a frame carried by the said axle, a hoisting drum carried by the frame, means for operating the drum, castings carried by a subaxle and transversely adjustable thereon, bars pivotally connected to the castings for vertical swinging movement, an angularly adjustable scraper carried by the bars and means carried by the hoisting drum for raising and lowering the bars and scraper.

11. In combination with a motor vehicle, a subaxle connected to the vehicle axle, longitudinally extending bars carried by the subaxle, a frame carried by the longitudinally extending bars, a hoisting drum carried by the frame, means for operating the hoisting drum, castings carried by the subaxle and transversely adjustable thereon, bars pivotally connected to the castings for vertical swinging movement, a scraper carried by the last mentioned bars, and means carried by the hoisting drum for raising and lowering the pivoted bars and scraper.

12. In combination with a motor vehicle, a subaxle connected to the vehicle axle, longitudinally extending bars connected to the subaxle, a frame carried by the longitudinally extending bars and longitudinally adjustable thereon, a hoisting drum carried by the frame, means for operating the hoisting drum, castings carried by the subaxle and transversely adjustable thereon, bars pivotally connected to the castings for vertical swinging movement, a scraper connected to the bars and means carried by the hoisting drum for raising and lowering the pivoted bars and scraper.

13. The combination with a vehicle, of a scraper, a frame, and means carried by the frame for raising and lowering the scraper, the frame and scraper being connectible to and disconnectible from the vehicle as a unit and the frame being adjustable longitudinally with respect to the vehicle.

14. The combination with a vehicle, of a scraper pivotally connected to the vehicle, a frame connected to the vehicle and longitudinally adjustable with respect thereto, and means carried by the frame for raising and lowering the scraper.

15. The combination with a vehicle, of a subaxle detachably connected to the vehicle axle, a frame carried by the subaxle and longitudinally adjustably with respect to the vehicle, a scraper pivotally connected to the subaxle, and means carried by the frame for raising and lowering the scraper.

16. The combination with a vehicle, of a scraper detachably connected to the vehicle, longitudinally extending bars detachably connected to the vehicle, a frame detachably connected to the bars and longitudinally adjustable thereon, and means carried by the frame for adjusting the scraper.

In testimony whereof I hereunto affix my signature.

RALEIGH H. STALEY.